United States Patent [19]

Reenberg

[11] Patent Number: 4,568,836
[45] Date of Patent: Feb. 4, 1986

[54] OCEAN WAVE ELECTRIC GENERATORS

[76] Inventor: Howard R. Reenberg, 443 W. 263rd St., Bronx, N.Y. 10471

[21] Appl. No.: 464,938

[22] Filed: Feb. 8, 1983

[51] Int. Cl.$^4$ .............................................. F03B 13/12
[52] U.S. Cl. ....................................... 290/53; 290/42; 60/499
[58] Field of Search .................... 290/42, 53; 417/100, 417/330–335; 60/497, 499, 500–502, 505, 506

[56] References Cited

U.S. PATENT DOCUMENTS

| 3,204,110 | 8/1965 | Masuda | 290/42 |
| 4,158,780 | 6/1979 | Wood | 290/42 |
| 4,189,918 | 2/1980 | Moody et al. | 290/53 |
| 4,208,876 | 6/1980 | Tsubota | 60/499 |

FOREIGN PATENT DOCUMENTS

| 2026621 | 2/1980 | United Kingdom | 290/53 |
| 1600360 | 10/1981 | United Kingdom | 290/42 |
| 650085 | 8/1980 | U.S.S.R. | 290/53 |

Primary Examiner—William M. Shoop, Jr.
Assistant Examiner—W. E. Duncanson, Jr.

[57] ABSTRACT

An apparatus for converting wave energy to electrical energy in a sea environment comprises a flotation duck anchored to the sea bottom and a turbine assembly pivotally connected thereto comprising an air chamber partially filled with liquid and/or granular particles having a turbine mounted on the upper portion thereof. The turbine is either self-rectifying or with a flap valve controlled entrance to the air chamber. A generator is coupled to the turbine and driven thereby. In operation, the motion of the waves causes the liquid and/or granular particles to compress the air within the chamber which is then used to drive the turbine. The spent air is fed back into the air chamber from the turbine as wave motion continues. In alternate embodiments the turbine generator assembly is mounted to the upper portion of an air chamber open to the sea on the bottom in an apparatus which rotates about a fixed or stable central axis. Gearing arrangements to drive the generator either alone or in combination with a liquid or air turbine drive are also disclosed. Compression of the air within the chamber or liquid, as the case may be, drives the turbine. Multiple assemblies may be readily coupled together to generate electrical energy in commercially practical quantities.

17 Claims, 6 Drawing Figures

OCEAN WAVE ELECTRIC GENERATORS

BACKGROUND OF THE INVENTION

The present invention relates to electrical generators for converting the wave energy in the sea to electrical energy. In view of the increasing price of fossil fuels and the dangers to the environment caused by consumpton of such fuels, there has been a considerable interest in the development of electrical energy from the sea. It has been known that the motion of waves and currents could be used to drive generators but the practicality of such generators has been a problem. The present invention is designed to overcome the disadvantages of the prior art and provide a commercially practical means of generating electrical energy from the waves of the sea.

In the prior art, U.S. Pat. No. 4,291,234 to Clark discloses as apparatus for generating electricity from waves including a liquid-tight chamber with a top opening, an anchoring mechanism and a mechanism for generating electrical current disposed within the chamber including a coil and movable magnet means. The invention appears to reside in the design of the chamber which is considerably different from the present invention and in the generating means which is similarly different.

In U.S. Pat. No. 3,697,764 to Stanziola et al, the motion of waves is converted to energy in the form of compressed air which is stored in large containers and then used to drive turbine generators. The turbine generators are selectively driven by the stored energy which may be controlled to meet demand. The structure and operation of the apparatus differs considerably from the present invention.

U.S. Pat. No. 3,758,788 Richeson discloses an energy conversion system wherein pairs of buoyant opposed structures are affixed together by pivot means to form a bellows effect which actuates a turbine.

U.S. Pat. No. 3,200,255 to Masuda relates to an ocean wave electric generator which comprises a buoyant structure having at least one air pump chamber positioned in the structure which is actuated as the water rises and falls in the air pump chamber. The generator is particularly useful for buoys since it is claimed that storage batteries can be eliminated in such applications.

Vartianien U.S. Pat. No. 2,715,366 discloses a generating apparatus where a plurality of cylinders are mounted on a floating platform and include pistons therein which are driven by wave energy to produce a source of power.

The above are merely representative patents as found in the prior art and are not intended to be an all inclusive listing of such patents. Other patents may exist and be pertinent to the present disclosure since this is a quite active area of interest. The present invention, however, represents an improvement over the existing prior art of which applicant is aware since it proposes an inexpensive highly reliable means for generating electrical energy from waves. The advantages of such a system are quite obvious since such energy is replaceable and environmentally clean.

SUMMARY OF THE INVENTION

The present invention relates to an apparatus for generating electrical energy from waves. In the invention, a flotation tank or duck of a particular configuration is anchored to the sea bottom by means of a spine coupled to a hinge connection on the tank and to the sea bottom. The tank may, for example, comprise a substantially cylindrical body having a flotation cone affixed thereto. If necessary, one or more sea anchors may also be connected to the spine to maintain the flotation tank in position. Another sea anchor is connected to the bottom edge of the apparatus to control movement and absorption of energy, if necessary.

Typically, the pivoting duck is anchored to the sea bottom by cable or chain. The anchor is fixed to a spine which includes bearings mounted thereto and a flotation tank with a solid or hollow core and a concentric outer chamber or sleeve affixed to the spine by the bearings, or the anchor may be fixed to a cylindrical spine which includes bearings mounted thereabout and a rotatable concentric outer chamber or sleeve spaced from the spine by the bearings. The duck chamber is filled with a predetermined amount of air at its upper portion and with liquid, and/or sand or other particles in the bottom portion of the chamber. A self-rectifying turbine or a turbine with flap valve controlled openings is mounted in the upper air-filled portion of the outer chamber and an electric generator is coupled thereto. The fluid and/or sand or other particles in the lower portion of the casing chamber or sleeve is used to compress and expand the air as the apparatus rotates with the wave motion.

A gear or roller drive mechanism may also be mounted to the upper portion of the spine to engage a gear system within or outside the duck which in turn is coupled to a generator. As the duck rotates about its axis, the spine gears drive the duck gearing to actuate the generator and produce electrical energy. Optionally, the duck may include a coupling having gears at the end thereof which engage and drive mating gears on the upper surface of the spine which may actuate one or more generators on the spine.

In another embodiment, a structure similar to the previous embodiment is utilized but a fluid drive is used wherein a liquid driven turbine and associated generator are mounted in the lower fluid filled portion of the sleeve and are driven by the water within the duck rather than compressed air during the rotation of the apparatus.

In a further embodiment of the invention, generating means are mounted within the flotation tank which is open to the sea wherein air is periodically compressed by the motion of the waves as the duck pivots about its core forcing water to drive air into the turbine. A turbine having an electrical generator connected thereto is mounted on the upper portion or may also be mounted inside or outside of the flotation tank to be driven by the compressed air and actuate the generator. The turbine is either self-rectifying or may include flap valve controlled openings through which the air enters and exits.

In a still further embodiment of the invention having a structure similar to the preceding embodiments, a separate air chamber having forward and rear portions is contained within duck chamber. The air chamber is open to the sea at its lower end and the air located therein is compressed and expanded by the wave movement and used to drive a turbine generator mounted in the upper portion of the air chamber. The upper end of the air chamber is open (or vented) to the outside air (or atmosphere), or it is open to the air contained in the concentric outer chamber or sleeve around the solid or hollow core and spaced from the cylindrical spine by the bearings.

In all of the embodiments disclosed above, batteries or groups of such apparatus may be coupled together to form large generating units. The specific coupling of such units is dependent upon the type of generator employed but all embodiments are adaptable to multiple unit installations.

Accordingly, an object of this invention is to provide a new and improved apparatus for generating electrical energy from ocean waves.

Another object of this invention is to provide a new and improved means for generating electrical energy by utilizing the motion of waves to compress and expand air within a chamber and thereby drive a turbine generator.

A further object of this invention is to provide a new and improved means for generating electrical energy from waves including a rotatable chamber sleeve mounted about a fixed or substantially stable axis coupled to an anchored spine, said sleeve rotating with the motion of waves and using a fluid to drive an integrally coupled turbine.

A still further object of this invention is to provide a new and improved electrical generating apparatus including an anchored spine having gear means coupled to gear means on a rotatable duck to drive generating means on the spine during the bobbing motion caused by waves.

A more specific object of this invention is to provide a new and improved apparatus for generating electrical energy from ocean waves which uses a fluid and/or sand or other particles in a hinged floating chamber causing it to drive a turbine coupled to said chamber.

BRIEF DESCRIPTION OF THE DRAWINGS

The above and other objects of the invention can be more clearly seen when viewed in conjunction with the accompanying drawings wherein.

DETAILED DESCRIPTION OF THE INVENTION

Figure 1:
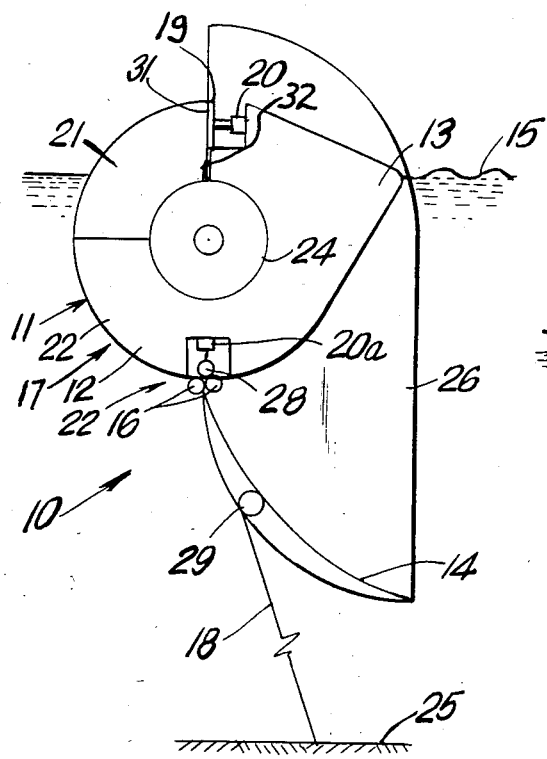
FIG. 1 is a schematic side view of a first embodiment of the invention comprising an apparatus for generatng electrical energy from ocean waves.

Referring now to the drawings, the invention comprises an electrical generating apparatus 10 for harnessing the energy of waves 15. The invention includes a flotation tank or duck 11 having a particular configuration as shown in FIG. 1. In the preferred embodiment, the duck 11 comprises an enlarged forward portion 12 mounted about a hollow or solid core 24 and narrowing down to a tail portion 13. This shape promotes a "bobbing" movement about the axis of the core 24 of the enlarged forward portion 12 due to wave action. The bouyant duck 11 is maintained in position in the sea by a coupling to the spine 14 which in turn is anchored to the sea floor 25. The spine, due to its shape, also serves to concentrate and direct the wave energy, acting as a scoop (to increase the height of wave peaks) and as a foil (to increase the depth of wave troughs). In practice, a plurality of ducks 11 would be anchored in position and joined together by a spine to generate a commercially significant amount of electricity.

Figure 6:
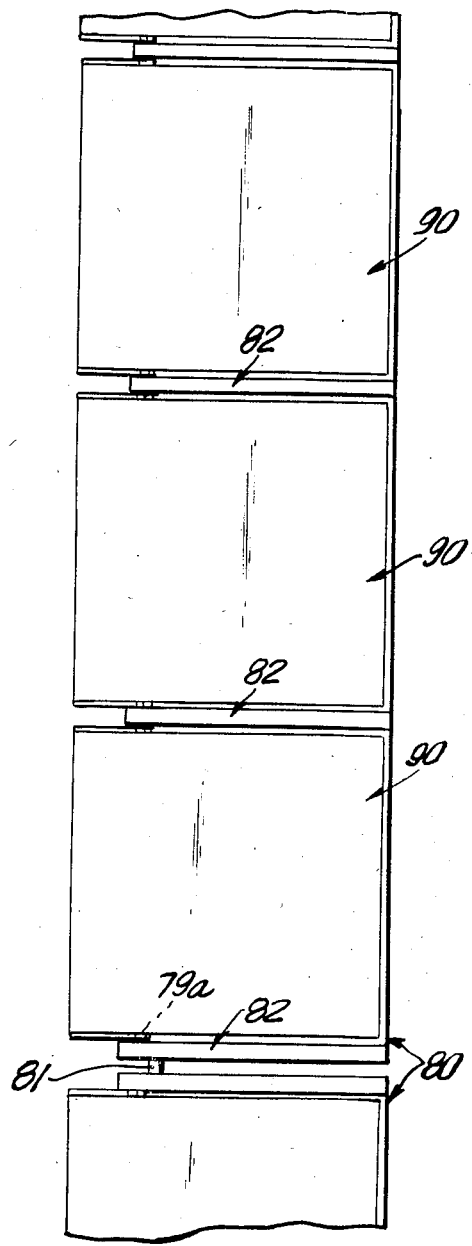

The duck 11 includes a ring or gear section 27 along the lower surface of the enlarged forward and rear portion 12, 13. Cooperating gears or rollers 28 which transmit power to the generator 20a are coupled to the spine. Gears or rollers 28 and 16 confine the ring or gear section 27 and provide a coupling (acting as a bearing for rotation) of the duck to the spine. The spine 14 comprises a downwardly extending curved member which is anchored near the spine interconnection or universal joints 29 to the sea floor by cable 18. Rollers or gears 16 are mounted on the upper end of the spine 14 to mesh with the ring section 27 on duck 11. The spine 14 also includes a sidewall 26 which extends upwardly between adjacent ducks 11 as shown in FIG. 6.

An air driven turbine 19 of a self-rectifying type is mounted within the hollow duck 11 together with a generator 20 mounted in an air bulb or air bell housing 23. The upper portion of the duck 11 includes an air chamber 21 which is open to a liquid and/or sand or other particle filled lower portion 17 so that the liquid and/or sand or other particles 22 drive air through the turbine 19 during the bobbing motion of the duck 11. The wave action forces air through an opening 31 in wall 32 under pressure which drives the turbine 19. The turbine 19 is coupled to generator 20 which is mounted in an air bulb or air bell housing 23 and produces electrical energy from the turbine drive.

The air bulb or air bell shown in the drawings may be elongated in the other direction in the other side view not shown.

Liquid and/or sand or particle entry into the turbine-generator area and possible damage caused by such entry is prevented by suitable buoyant flap means. During the trough motion of the wave 15, the air returns back into the air chamber 21 through suitable valve means. Alternatively, a conventional turbine and an air inlet and outlet controlled by flap valves may be utilized. Containment of the generator (and gears or motor in other embodiments) in an air bulb or air bell housing prevents liquid or particle entry without the need for a watertight seal. As the liquid or particle level rises outside the housing, air pressure in the air bulb or air bell housing which is open to the liquid or particles 22 on the bottom or has a non-watertight seal on the bottom increases, while the limited area towards the top in which the air is compressed and contained decreases, and stops the water from rising above a predetermined level and from reaching the generator, and gears or motor. The generator, and gears or motor in any of the embodiments of the invention may be contained in an air bulb or air bell housing 23 by suitable arrangements. In an alternate use, an air bulb or air bell housing may be used to contain a generator and gears or motor to be used with a water driven turbine which may be used in conjunction with a dam.

FIG. 1 shows a plurality of rollers or gears in contact with the ring 27. They serve to confine the ring 27 and act as a bearing for rotation of the duck 11. There are, for example, two rollers or gears shown in sideview at 28 to drive the connecting gearing (not shown) and the generator as in Masuda U.S. Pat. No. 3,204,110, or there may be rollers or gears which hydrostatically drive the generator as in Wood U.S. Pat. No. 4,158,780. The gear or roller drive mechanism may also be affixed to the duck 11 and be operated through engagement with a ring (or ring gear) section 27 on the spine 14. The generator 20a would be located in or on the duck 11, and would be driven through a suitable coupling with the drive mechanism. Alternatively, the gear or roller drive 28 and generator 20a may be mounted inside the duck 11. The gears and rollers 28 would then be on a cart-like arrangement which would revolve on a track within the duck 11.

Figure 2:
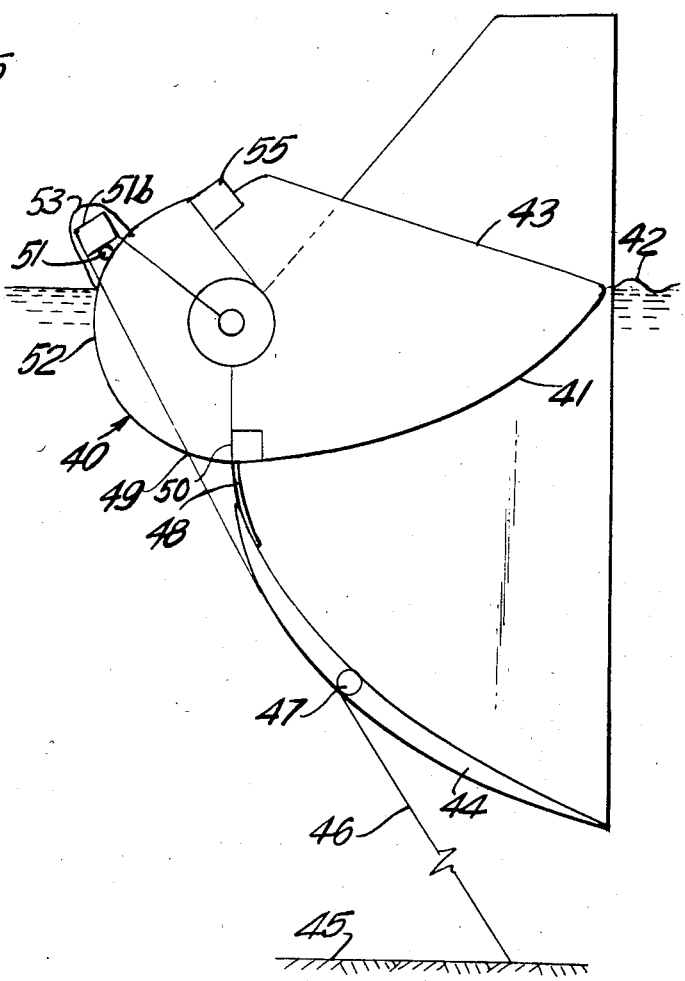
FIG. 2 is a schematic side view of a second embodiment of the invention for generating electrical energy from waves.

In the embodiment of FIG. 2, the shaft mounted duck 40 is of a different configuration from the embodiment of FIG. 1, having a curved lower surface 41 riding in the water 42 and a rearwardly tapering upper surface 43. The spine 44 is anchored to the sea floor 45 by cable 46 which is connected to the spine near the universal joint 47. A buoyant flexible flap 48 of the bellows type or a buoyant sliding gate is mounted to the spine 44 and extends upwardly to contact the lower edge of the duck 40 to prevent water leakage between the spine 44 and duck 40. A liquid driven turbine 50 may be mounted in the lower portion of the duck 40. The turbine 50 is either of the self-rectifying type or with the inlet and outlet controlled by flap valves. The turbine 50 would be actuated during wave motion creating an output which would drive an interconnected generator (not shown).

The spine 44 may also be connected by coupling 49 to gears or rollers 51 which ride on the duck edge 52. The gears or rollers 51 engage the duck edge driving the generator via one way clutches or ratchets, or a hydrostatic drive mechanism, as the duck 40 moves up and down. The generator and gears or motor 51b may be located in an air bulb or air bell housing 53 to prevent water entry without the need for a watertight bearing seal. The rollers 51 may be flexible or pneumatic tires, or gears.

An optional air driven turbine 55 may also be included within the duck similar to FIG. 1 to drive another separate generator (not shown). Additionally in variations of the invention, the driving gears or rollers and the generator may be affixed to the spine 44 at various locations and come in contact with the duck 40 or a ring or ring gear attached to the duck at various locations, or they may be affixed to the duck 40 at various locations and come in contact with the edge or a protruding ring or the sidewall of the spine 44.

Figure 3:
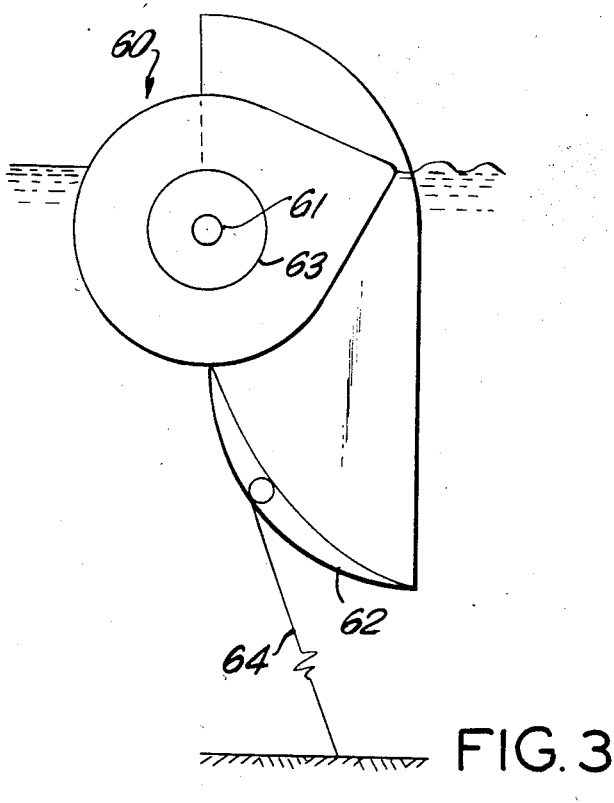
FIG. 3 is a schematic side view of another embodiment of the invention.

FIG. 3 shows a duck 60 on a shaft mounted to the spine 62 with bearings. The gear, or pump and motor, and generator housing 63 are affixed to the spine 62. The spine 62 includes the cable 64 for anchoring purposes disclosed above. The fluid pump type arrangement could include variations such as a vane, rocker arm driving pistons in cylinders, an archimedian screw, etc., while the motor arrangement could include either a self-rectifying turbine with two way fluid flow or a conventional hydraulic motor or one directional fluid flow turbine controlled by valves, and may include a fluid reservoir system.

Figure 4:
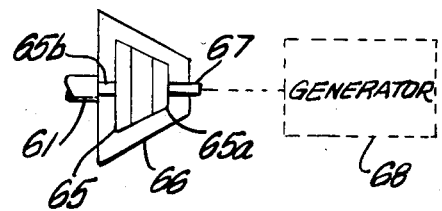
FIG. 4 is a schematic view showing the turbine mounting in the embodiment of FIG. 3.

FIG. 4 relates to the embodiment of FIG. 3 and shows the coupling of the duck shaft 61 to a turbine pump 65 which drives fluid in alternating directions through a sefl-rectifying turbine 65a. The shaft 61 is connected to the turbine shaft 65b with the self-rectifying turbine output shaft 67 extending outwardly from the opposite side of the housing 66 to drive the generator 68.

Figure 5:
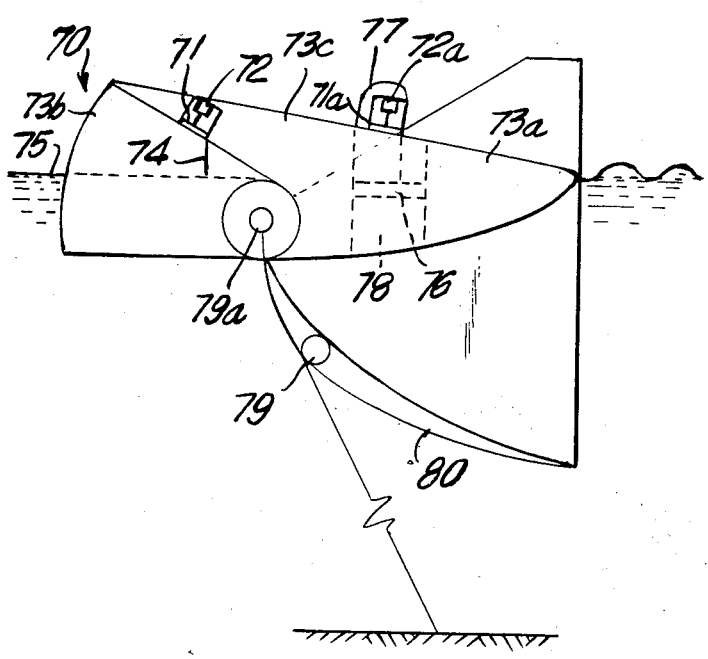
FIG. 5 is a schematic side view of an alternate embodiment of the invention; and, FIG. 6 is a schematic top view showing a plurality of wave generating units joined together.

Another embodiment of the invention is shown in FIG. 5 wherein the hollow duck 70 includes a turbine 71 and generator 72 mounted therein with the air vented from the turbine 71 to the outside through a snorkel valve (not shown) or fed into the rear air chambers 73a. A buoyant flap valve 74 closes when water 75 reaches a predetermined level to prevent entry into the turbine generator area. The duck 70 is divided into front, middle and rear air chambers 73b, 73c and 73a. Middle and rear air chambers 73c and 73a are joined by pipe or air sleeve 76. A turbine 71a and generator 72a with a snorkel valve air vent 77 are mounted on top of the duck 70 above chamber 78 which contains air and is open to the sea at the bottom. As water rises and lowers in the chamber with wave motion, air is pumped and suctioned through a self-rectifying turbine, or passes through a turbine which has its inlet and outlet controlled by flap valves. The turbine is drivingly connected to the generator. The ducks or rafts 70 as the case may be, are mounted on shafts 79a with bearings permitting rotation thereabout. The spines 80 are generally interconnected with universal joints 79 when a plurality of individual duck units 99 are coupled together with multiple spines as in FIG. 6. Movement of the duck 70 about shaft 79a due to wave action forces air through the turbine 71 to drive the generator 72.

FIG. 6 shows a typical mounting of a plurality of electrical generating units 90 wherein the spines 80 are interconnected by universal joints 81 to form a large generating system. The individual ducks 90 are joined to the spines 80 as described above and "bob" within the spine sidewalls 82.

The spines may also be affixed to submersible or semi-submersible portion ends, or offshore oil rigs, or they may be arranged in an array so that the ducks serve as a breakwater and power source for oil rigs. They may also be affixed by adjustable height attachments (sleeves) to rigid frames fixed to the sea bed.

In the embodiments described above, a wave sensing device is attached to or mounted in front of the spines or in the ducks, to send electrical signals to the duck controlling the load on the generator. The force or velocity of the waves is sensed in one case by an arrangement similar to that disclosed in Wood U.S. Pat. No. 4,158,780 and fed back to vary the motor displacement. Alternatively, the sensing means can provide feedback to the generator as in Salter U.S. Pat. No. 4,134,023.

While the invention has been explained by a detailed description of certain specific embodiments, it is understood that various modifications and substitutions can be made in any of them within the scope of the appended claims which are intended also to include equivalents of such embodiments.

I claim:

1. An apparatus for generating electricity from ocean waves comprising:

a hollow buoyant duck positioned in the path of waves including a core about the center axis of which the duck rotates, a lower chamber portion having liquid therein and an upper chamber portion having air therein, said air being alternately compressed and expanded by the liquid in the chamber during the rotational motion of the duck caused by waves, a turbine mounted in the upper portion of the duck and driven by the compressed and expanded air, a generator coupled to the turbine and operated thereby to produce electrical energy and an air bulb having the generator mounted therein, and, a spine having a transverse axial shaft, means anchoring the spine to the ocean floor and means on the upper portion of the spine engaging the duck to maintain said duck in position, said spine having a curved configuration to concentrate and direct wave energy and wherein said spine configuration acts as a scoop to increase the height of wave peaks and as a foil to increase the depth of wave troughs.

2. An apparatus for generating electricity from ocean waves in accordance with claim 1 wherein:

the lower chamber in the duck includes granular particles therein, and wherein the upper chamber includes an opening to the lower chamber portion whereby the granular particles move through the opening compressing the air during wave motion and further including means to prevent the granular particles from contacting the generator.

3. An apparatus for generating electricity from ocean waves in accordance with claim 1 wherein:

the spine comprises a transverse axial shaft for coupling to adjacent generating apparatus, an upwardly extending side wall for purposes of stability and a cable mounted to the spine, said cable being anchored at its other end to the ocean floor.

4. An apparatus for generating electricity from ocean waves in accordance with claim 1 wherein:

the duck includes an enlarged curved forward portion and a rear portion tapering from the forward portion on top and bottom to enhance the rotational movement of the duck about the axis due to wave action.

5. An apparatus for generating electricity from ocean waves in accordance with claim 1 further including:

a snorkel valve mounted on the upper portion of the duck for venting an intake of air through the turbine, said liquid chamber being open to the ocean on its bottom.

6. An apparatus for generating electricity from ocean waves in accordance with claim 1 further including:

foward, middle and rear portions to the air chamber and a pipe joining said middle and rear portions to vent air into the rear portion from the turbine, and, valve means regulating the level of water within the duck to prevent water entry to the turbine generator area.

7. An apparatus for generating electricity from ocean waves in accordance with claim 1 wherein:

the apparatus includes a plurality of ducks coupled in an array, said adjacent spines being coupled together to form an integral group of units.

8. An apparatus for generating electricity from ocean waves comprising:

a hollow buoyant duck positioned in the path of waves including a core about the center axis of which the duck rotates, a lower chamber portion having liquid therein and an upper chamber portion having air therein, said air being alternately compressed and expanded by the liquid in the chamber during the rotational motion of the duck caused by waves, a turbine mounted in the upper portion of the duck and driven by the compressed and expanded air, a generator coupled to the turbine and operated thereby to produce electrical energy and an air bulb having the generator mounted therein, and, a spine having a transverse axial shaft, means anchoring the spine to the ocean floor and means on the upper portion of the spine engaging the duck to maintain said duck in position, said spine having a curved configuration to concentrate and direct wave energy and wherein said spine configuration acts as a scoop to increase the height of wave peaks and as a foil to increase the depth of wave troughs, and, wherein the duck further includes a lower ring portion, said ring portion being engaged and driving means on the upper portion of the spine and a generator located on the spine to be driven by the means on the upper portion as the duck rotates about the axis.

9. An apparatus for generating electricity from ocean waves in accordance with claim 8 wherein:

the duck includes a ring gear section on the lower surface thereof, and, the spine includes gears on the upper portion thereof engaging the ring gear section to drive the generator as the duck rotates due to wave action.

10. An apparatus for generating electricity from ocean waves in accordance with claim 1 wherein:

the duck includes a second generator, and, the spine further includes an upper ring portion having gears associated therewith, said ring portion being engaged by means on the lower portion of the duck to drive the second generator as the duck rotates about the axis.

11. An apparatus for generating electricity from ocean waves in accordance with claim 10 wherein:

the spine includes a ring gear section on the upper surface thereof, and the duck includes gears on the lower portion thereof engaging the ring gear section to drive the second generator as the duck rotates due to wave action.

12. An apparatus for generating electricity from ocean waves in accordance with claim 10 wherein:

the duck and spine include first and second generators respectively with the first generator being connected to the air operated turbine in the duck to be driven thereby and the second generator in the duck being connected to the gears associated with the ring portion to be driven thereby.

13. An apparatus for generating electricity from ocean waves in accordance with claim 10 wherein:

the spine includes a stationary coupling extending outwardly therefrom and having a ring or gear section on the other end thereof and the duck includes gear means on the upper surface thereof engaging and being driven by the spine ring gear section as the duck rotates back and forth, said gear means being coupled to the generator and an air bulb or air bell housing within which said gear means and generator are mounted.

14. An apparatus for generating electricity from ocean waves in accordance with claim 8 wherein:

the duck and spine include first and second generators with the first generator located on the duck being connected to the air operated turbine in the duck to be driven thereby and the second generator located on the spine being connected to the gears associated with the ring portion to be driven thereby.

15. An apparatus for generating electricity from ocean waves in accordance with claim 8 wherein:

the spine includes a stationary coupling extending outwardly therefrom and having gear means on the other end thereof and the duck includes ring gear section on the upper surface thereof engaging and driving the spine gear means as the duck rotates back and forth, said gear means being coupled to the generator and an air bulb or air bell housing within which said generator and gears are mounted.

16. An apparatus for generating electricity from ocean waves in accordance with claim 15 further including:

a buoyant flexible flap or buoyant sliding gate mounted to the spine and extending upwardly therefrom to slide along the duck and prevent water leakage between the spine and duck.

17. An apparatus for generating electricity from ocean waves in accordance with claim 8 wherein:

the duck further includes a liquid driven turbine mounted in the lower portion of the duck to be operated by the movement of water therein as the duck rotates, said turbine being coupled to the generator to produce electrical energy.

* * * * *